United States Patent
Sugano (10) Patent No.: US 11,173,895 B2
(45) Date of Patent: Nov. 16, 2021

(54) PARKING SUPPORT APPARATUS (71) Applicant: TOYOTA JIDOSHA KABUSHIKI KAISHA, Toyota (JP)

(72) Inventor: Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 16/356,106

(22) Filed: Mar. 18, 2019

(65) Prior Publication Data
US 2019/0283737 A1  Sep. 19, 2019

(30) Foreign Application Priority Data

Mar. 19, 2018 (JP) .............................. JP2018-050863

(51) Int. Cl.
| | |
|---|---|
| *B60W 30/06* | (2006.01) |
| *B60R 16/037* | (2006.01) |
| *G06Q 50/30* | (2012.01) |
| *G06Q 10/02* | (2012.01) |
| *G05D 1/00* | (2006.01) |
| *G06F 3/01* | (2006.01) |
| *B62D 15/02* | (2006.01) |
| *G06F 3/16* | (2006.01) |
| *G06K 9/00* | (2006.01) |

(52) U.S. Cl.
CPC ......... *B60W 30/06* (2013.01); *B60R 16/0373* (2013.01); *B62D 15/0285* (2013.01); *G05D 1/0011* (2013.01); *G06F 3/017* (2013.01); *G06F 3/16* (2013.01); *G06K 9/00335* (2013.01); *G06Q 10/02* (2013.01); *G06Q 50/30* (2013.01)

(58) Field of Classification Search
CPC .............. B60W 30/06; B60R 16/0373; B62D 15/0285; G05D 1/0011; G06F 3/017; G06F 3/16; G06K 9/00335; G06Q 10/02; G06Q 50/30
See application file for complete search history.

(56) References Cited

U.S. PATENT DOCUMENTS

| | | | |
|---|---|---|---|
| 2008/0154613 A1 | 6/2008 | Haulick et al. | |
| 2011/0179387 A1* | 7/2011 | Shaffer | G06F 9/542 |
| | | | 715/835 |

(Continued)

FOREIGN PATENT DOCUMENTS

| | | |
|---|---|---|
| CN | 101395048 A | 3/2009 |
| CN | 106960486 A | 7/2017 |

(Continued)

*Primary Examiner* — Tyler J Lee
*Assistant Examiner* — Yufeng Zhang
(74) *Attorney, Agent, or Firm* — Sughrue Mion, PLLC (57) ABSTRACT

A parking support apparatus configured to perform a parking control for automatically parking a vehicle in a target parking position. The parking support control is provided with: a detector configured to obtain a signal of a vehicle external sensor that can detect at least one of a movement and a voice/sound of a user who is outside the vehicle and to determine whether or not the at least one of the movement and the voice/sound of the user matches a parking instruction action set in advance, thereby detecting a particular parking instruction action of the user; and a starter configured to start the parking control if the parking instruction action is detected.

5 Claims, 4 Drawing Sheets (56) References Cited

U.S. PATENT DOCUMENTS

| | | | | |
|---|---|---|---|---|
| 2013/0130674 A1* | 5/2013 | De Wind | ............ | B60Q 1/2696 |
| | | | | 455/420 |
| 2014/0306814 A1 | 10/2014 | Ricci | | |
| 2015/0353080 A1* | 12/2015 | Mukaiyama | ............ | E05B 77/54 |
| | | | | 701/23 |
| 2016/0096509 A1* | 4/2016 | Ette | ........................ | B60R 25/01 |
| | | | | 382/103 |
| 2016/0144857 A1 | 5/2016 | Ohshima | | |
| 2016/0207528 A1 | 7/2016 | Stefan et al. | | |
| 2017/0197636 A1* | 7/2017 | Beauvais | ................ | G06F 3/167 |
| 2018/0170367 A1 | 6/2018 | Ohshima | | |

FOREIGN PATENT DOCUMENTS

| | | | |
|---|---|---|---|
| GB | 2525383 | A | 10/2015 |
| JP | 2006-302187 | A | 11/2006 |
| JP | 2007-295033 | A | 11/2007 |
| JP | 2011141854 | A | 7/2011 |
| JP | 2016-74285 | A | 5/2016 |
| JP | 2016-97927 | A | 5/2016 |
| JP | 2016-099953 | A | 5/2016 |

* cited by examiner

<DOORKNOB SENSOR>

| DETECTED ONCE | DETECTED TWICE IN A ROW |
|---|---|
| DOOR LOCK OPERATION | PARKING INSTRUCTION ACTION |

FIG. 3B

<KICK SENSOR>

| DETECTION TIME IS LESS THAN PREDETERMINED THRESHOLD VALUE | DETECTION TIME IS GREATER THAN OR EQUAL TO PREDETERMINED THRESHOLD VALUE |
|---|---|
| REAR HATCH OPEN/CLOSE OPERATION | PARKING INSTRUCTION ACTION |

FIG. 4

PARKING SUPPORT APPARATUS

CROSS-REFERENCE TO RELATED APPLICATIONS

This application is based upon and claims the benefit of priority of the prior Japanese Patent Application No. 2018-050863, filed on Mar. 19, 2018, the entire contents of which are incorporated herein by reference.

BACKGROUND

1. Technical Field

Embodiments of the present disclosure relate to a parking support apparatus configured to support a parking operation of a vehicle.

2. Description of the Related Art

For this type of apparatus, for example, there is known an apparatus configured to automatically perform a parking operation by controlling the driving of a vehicle. For example, Japanese Patent Application Laid Open No. 2016-99953 (Patent Literature 1) proposes a technology/technique of automatically parking an unmanned vehicle in a parking space by allowing the automatic driving of the vehicle on a route in a parking lot. The Patent Literature 1 discloses that a user of this apparatus operates a remote operation terminal from the outside of the vehicle to start an automatic parking control of the vehicle.

In the technology/technique described in the Patent Literature 1, when staring the automatic parking control, the user may need to take out the remote operation terminal and perform a predetermined operation. Such an operation may cause the user to feel troublesome. In other words, in the technology/technique described in the Patent Literature 1, there is room for improvement to preferably start the automatic parking control.

SUMMARY

In view of the aforementioned problems, it is therefore an object of embodiments of the present disclosure to provide a parking support apparatus that can preferably start a parking control of a vehicle.

The above object of embodiments of the present disclosure can be achieved by a parking support apparatus configured to perform a parking control for automatically parking a vehicle in a target parking position, the parking support control provided with: a detector configured to obtain a signal of a vehicle external sensor that can detect at least one of a movement and a voice/sound of a user who is outside the vehicle and to determine whether or not the at least one of the movement and the voice/sound of the user matches a parking instruction action set in advance, thereby detecting a particular parking instruction action of the user; and a starter configured to start the parking control if the parking instruction action is detected.

DETAILED DESCRIPTION OF THE EMBODIMENT

A parking support apparatus according to an embodiment of the present disclosure will be explained with reference to the drawings.

Configuration of Apparatus

Figure 1:
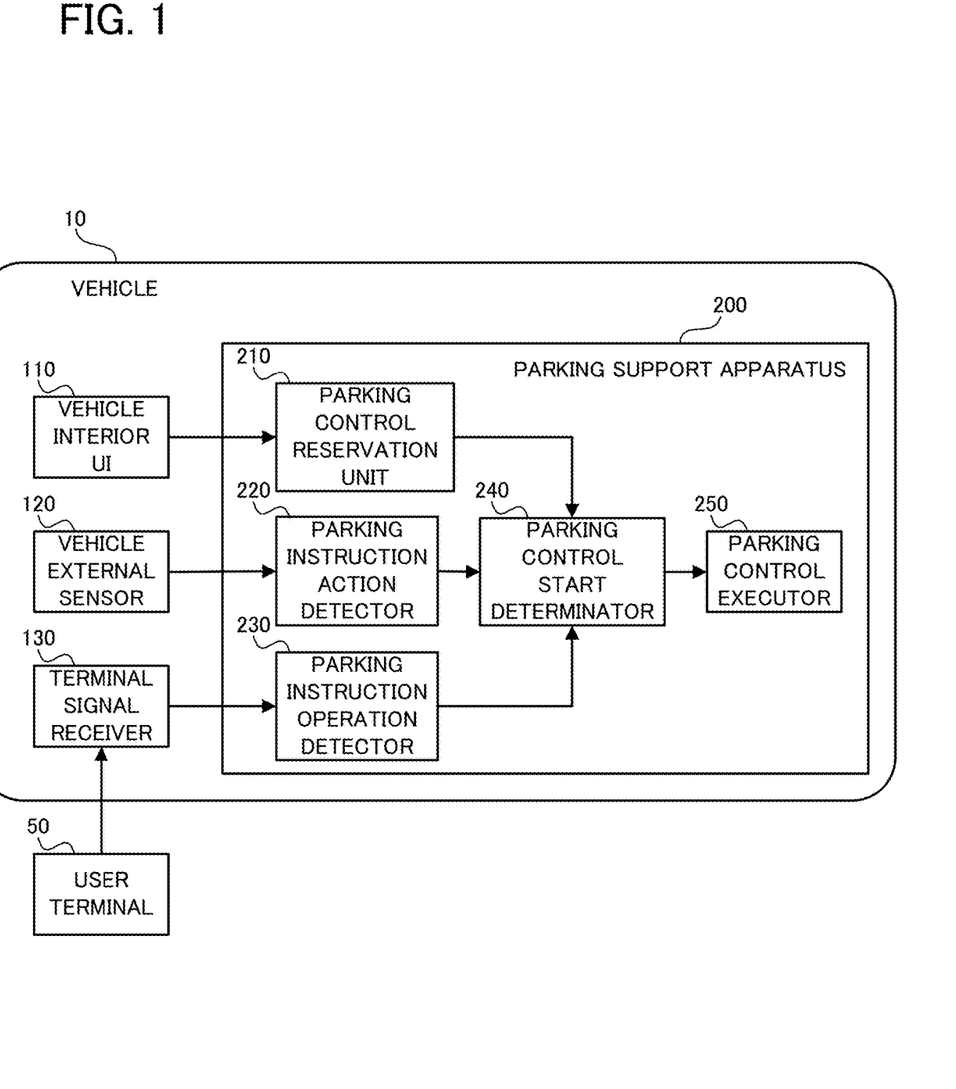
FIG. 1 is a block diagram illustrating a configuration of a vehicle according to an embodiment.

Firstly, an explanation will be given to an entire configuration of a vehicle on which the parking support apparatus according to the embodiment is mounted, with reference to FIG. 1. FIG. 1 is a block diagram illustrating the configuration of the vehicle according to the embodiment.

As illustrated in FIG. 1, a vehicle 10 according to the embodiment is provided with a vehicle interior user interface (UI) 110, a vehicle external sensor 120, a terminal signal receiver 130, and a parking support apparatus 200.

The vehicle interior UI 110 is provided, for example, with a switch, a touch panel, or the like, and is configured to receive various operations performed by a user who is in a vehicle interior. The vehicle interior UI 110 according to the embodiment is particularly configured to accept or receive a reservation operation (which will be detailed later) of a parking control for automatically parking the vehicle 10. Information about the reservation operation may be outputted to a parking control reservation unit 210 of the parking support apparatus 200.

The vehicle external sensor 120 is configured to detect at least one of a movement and a voice/sound of the user who is outside the vehicle 10. Specifically, the vehicle external sensor 120 is provided to detect a parking instruction action, which includes a particular movement and a particular voice/sound for staring the parking control of the vehicle 10. Information about the user's movement and voice/sound detected by the vehicle external sensor 120 may be outputted to a parking instruction action detector 220 of the parking support apparatus 200.

Figure 2:
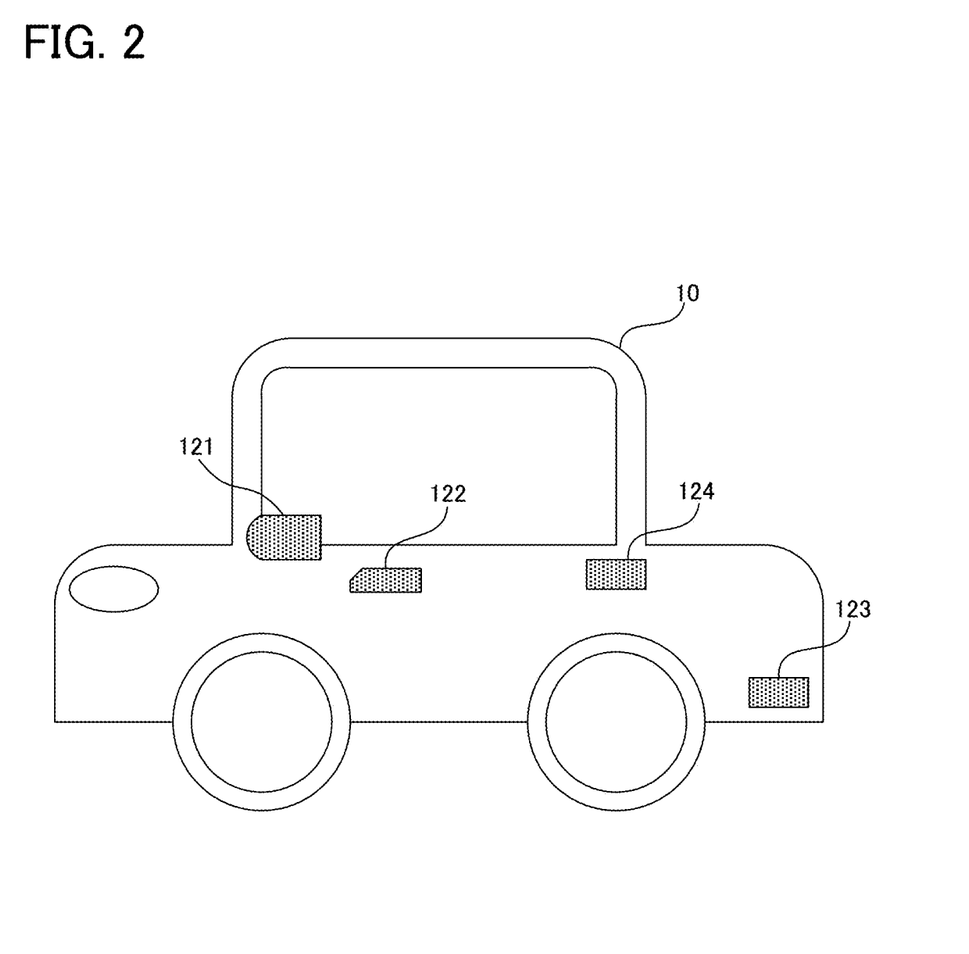
FIG. 2 is a schematic diagram illustrating a specific example of a vehicle external sensor.

Now, a specific configuration example of the vehicle external sensor 120 will be explained with reference to FIG. 2. FIG. 2 is a schematic diagram illustrating the specific example of the vehicle external sensor.

As illustrated in FIG. 2, the vehicle external sensor 120 may include a camera 121 mounted on a side mirror, a doorknob sensor 122 mounted on a doorknob, a kick sensor 123 mounted near a rear part of the vehicle 10, and a sound sensor 124, and the like.

The camera 121 is provided so that the user who is outside the vehicle 10 can be imaged, and is intended to detect the user's movement, such as, for example, a gesture by the user. The doorknob sensor 122 is configured, for example, as a contact sensor or the like, and is intended to detect a doorknob operation performed by the user. The kick sensor 123 is intended to detect the user's leg movement near the rear part of the vehicle 10. The sound sensor 124 is intended to detect the voice/sound of the user who is outside the vehicle 10.

All of the camera 121, the doorknob sensor 122, the kick sensor 123, and the sound sensor 124 are not necessarily provided for the vehicle 10, but at least one of them may be provided. Each of the camera 121, the doorknob sensor 122, the kick sensor 123, and the sound sensor 124 may be configured to detect another movement and another voice/sound of the user, other than the parking instruction action; namely, each of them may have not only a function of detecting the parking instruction action, but also a function of detecting an operation other than the parking instruction action.

Back in FIG. 1, the terminal signal receiver 130 is configured to receive a signal transmitted from a user terminal 50. The user terminal 50 may be an exclusive terminal for communicating with the terminal signal receiver 130, or may be a versatile terminal, such as a smart phone. The terminal signal receiver 130 according to the embodiment is provided particularly to receive a signal for instructing the start of the parking control, from the user terminal 50. Information indicated by the signal received by the terminal signal receiver 130 may be outputted to a parking instruction operation detector 230 of the parking support apparatus 200.

The parking support apparatus 200 is a controller unit programmed or configured to control each part of the vehicle 10, and is configured to perform the parking control for automatically parking the vehicle 10 in a parking space. The parking support apparatus 200 is provided with the parking control reservation unit 210, the parking instruction action detector 220, the parking instruction operation detector 230, a parking control start determinator 240, and a parking control executor 250, as physical processing circuits or processing blocks for realizing its function.

The parking control reservation unit 210 is configured to set a reservation state of the parking control, on the basis of the information about the operation by the user, which is inputted from the vehicle interior UI 110. Specifically, if the information about the operation by the user, which is inputted from the vehicle interior UI 110, is intended to set the reservation of the parking control, the parking control reservation unit 210 may set the reservation state of the parking control to be on, i.e., the parking control reservation unit 210 may set the parking control to be reserved. On the other hand, if the information about the operation by the user, which is inputted from the vehicle interior UI 110, is not intended to set the reservation of the parking control, the parking control reservation unit 210 may set the reservation state of the parking control to remain off, i.e., the parking control reservation unit 210 may set the parking control to be not reserved. If the information about the operation by the user, which is inputted from the vehicle interior UI 110, is intended to cancel the reservation of the parking control, the parking control reservation unit 210 may change the reservation state of the parking control from on to off. The parking control reservation unit 210 may also set and cancel the reservation, on the basis of information inputted from a device other than the vehicle interior UI 110 (e.g., the user terminal 50, etc.). Information about the reservation state of the parking control, which is set by the parking control reservation unit 210, may be outputted to the parking control start determinator 240. The parking control reservation unit 210 is a specific example of the "reservation device" in Supplementary Notes described later.

The parking instruction action detector 220 is configured to detect the parking instruction action for instructing the start of the parking control, from at least one of the user's movement and voice/sound detected by the vehicle exterior sensor 120. Specifically, the parking instruction action detector 220 may determine whether or not at least one of the user's movement and voice/sound detected by the vehicle exterior sensor 120 matches the movement and the voice/sound that are set in advance as the parking instruction action. More specifically, the parking instruction action detector 220 may determine, for example, whether or not the user's movement detected by the camera 121 is a particular gesture, whether or not the user's operation for the doorknob sensor 122 is a particular operation, whether or not the user's leg movement detected by the kick sensor 123 is a particular movement, and whether or not the user's voice/sound detected by the sound sensor 124 is a particular voice/sound. The "particular movement" detected by the parking instruction action detector 220 may be an action that can be detected by the vehicle external sensor 120, and may not include an action that can be detected by using the signal transmitted from the user terminal 50. A specific determination method using each sensor, which is performed by the parking instruction action detector 220, can adopt the existing techniques/technologies, as occasion demands, and a detailed explanation of the determination method will be thus omitted.

If a plurality of types of sensors are provided as the vehicle external sensor 120, the parking instruction action detector 220 may separately use respective detection results of the sensors for the determination, or may combine the respective detection results to be used for the determination. For example, if an action that matches the parking instruction action is detected on some sensor out of the plurality of types of sensors, then, it may be determined that the parking instruction action is detected. Alternatively, it may be determined that the parking instruction action is detected only if an action that matches the parking instruction action is detected on all of the plurality of types of sensors. In this case, the parking instruction action may be set as a composite action for the plurality of types of sensors. If detecting the parking instruction action, the parking instruction action detector 220 is configured to output that to the parking control start determinator 240. The parking instruction action detector 220 is a specific example of the "detector" in Supplementary Notes described later.

Figure 3A:
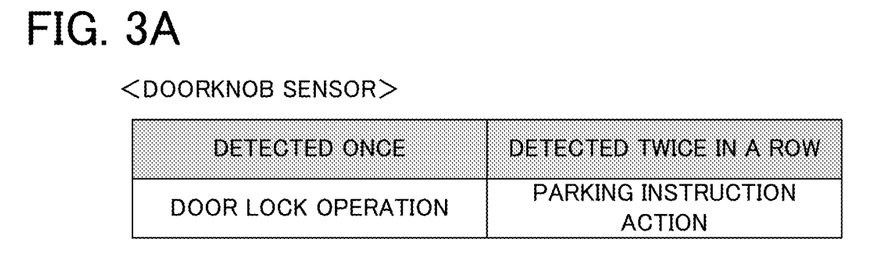
FIG. 3A is a table illustrating a specific example of a movement detected as a parking instruction action and a specific example of a movement detected as another action.
Figure 3B:
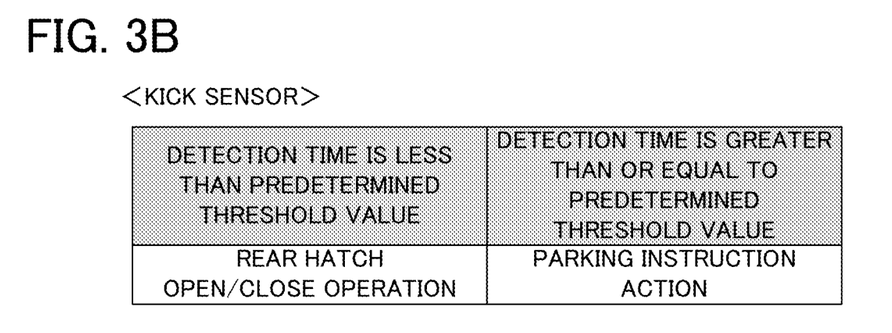
FIG. 3B is a table illustrating a specific example of the movement detected as the parking instruction action and a specific example of the movement detected as another action.

By the way, if the vehicle external sensor 120 has another function other than the function of detecting the parking instruction action, the particular movement or the particular voice/sound that is set as the parking instruction action may be set to be different from a movement or a voice/sound corresponding to the another function. Hereinafter, a specific example will be explained with reference to FIG. 3A and FIG. 3B. FIG. 3A and FIG. 3B are tables illustrating specific examples of a movement detected as the parking instruction action and specific examples of a movement detected as another action.

As illustrated in FIG. 3A, if the user's operation is detected only once on the door knob sensor 122, the operation is determined to be an operation for changing the on and off of a door lock. On the other hand, if the user's operation is detected twice in a row on the door knob sensor 122, i.e., if the operation is performed successively in an extremely short period, the operation is determined to be the parking instruction action. In a situation in which the parking control is reserved, i.e., in a situation in which the reservation state is on, however, even if the user's operation is detected only once, the operation may be determined to be the parking instruction action.

As illustrated in FIG. 3B, if a time in which the user's leg is detected on the kick sensor 123 is less than a predetermined threshold value, the operation is determined to be an operation for opening and/or closing a rear hatch. On the other hand, if the time in which the user's leg is detected on the kick sensor 123 is greater than or equal to the predetermined threshold value, the operation is determined to be the parking instruction action. The predetermined threshold value may use any value that is obtained as an optimum value to distinguish between the two operations. Moreover, in the situation in which the parking control is reserved, even if the time in which the user's leg is detected is less than the predetermined threshold value, the operation may be determined to be the parking instruction action.

As described above, even when the vehicle external sensor 120 has another function other than the function of detecting the parking instruction action, if the parking instruction action and another action are separately set, then, it is possible to prevent the two actions from being mixed up. In other words, by setting the parking instruction action to be an action that can be distinguished from an operation corresponding to another function, the existing vehicle external sensor 120 can be used to detect the vehicle instruction action.

Back in FIG. 1 again, the parking instruction operation detector 230 is configured to detect that a parking instruction operation, i.e., an operation for instructing the start of the parking control, is started by the user, on the basis of the information inputted from the terminal signal receiver 130, i.e., information about the content of an operation of the user terminal 50. If detecting the parking instruction operation, the parking instruction operation detector 230 is configured to output that to the parking control start determinator 240.

The parking control start determinator 240 is configured to determine whether or not the parking control is to be started, on the basis of the respective information inputted from the parking control reservation unit 210, the parking instruction action detector 220, and the parking instruction operation detector 230. Specifically, if any of the parking instruction action and the parking instruction operation is detected in the situation in which the parking control is reserved, the parking control start determinator 240 may determine that the parking control is to be started. If determining that the parking control is to be started, the parking control start determinator 240 is configured to output an instruction for starting the parking control, to the parking control executor 250.

The parking control executor 250 is configured to perform the parking control for automatically parking the vehicle 10 if the parking control start determinator 240 determines that the parking control is to be started. Specifically, the parking control executor 250 may control each part of the vehicle 10 (e.g., an accelerator actuator, a brake actuator, a steering actuator, etc.), thereby controlling the driving of the vehicle 10 so that the parking in a parking space that is a parking target is completed. A specific control content of the parking control here can adopt the existing techniques/technologies, as occasion demands, and a detailed explanation of the control content will be thus omitted. The parking space that is a parking target may be automatically determined in accordance with a position of the vehicle and availability, or may be a parking space set when the reservation of the parking control is set on the parking control reservation unit 210, i.e., may be a parking space set in accordance with the operation of the vehicle interior UI 100.

Explanation of Operation

Figure 4:
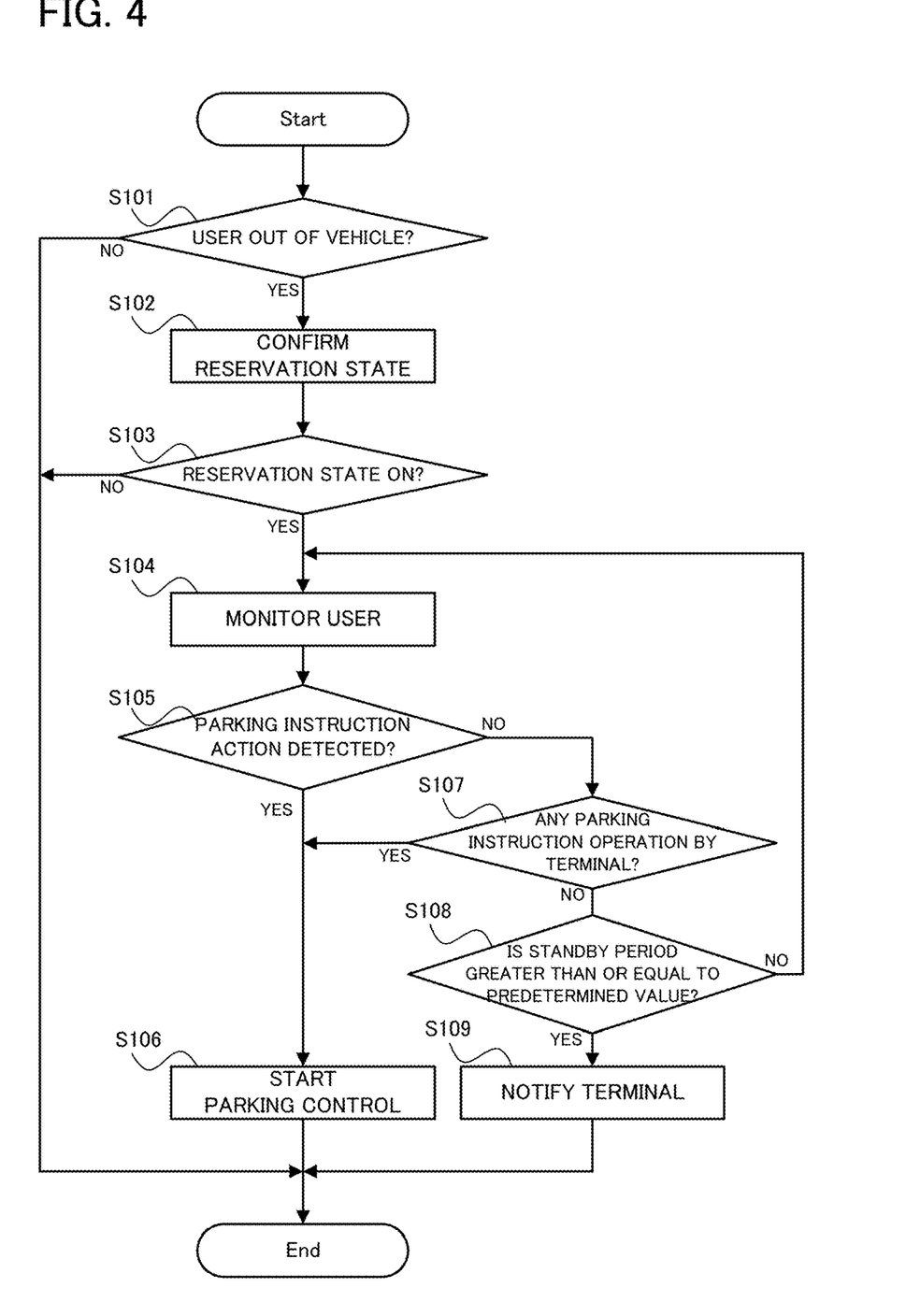
FIG. 4 is a flowchart illustrating a flow of operation of a parking support apparatus according to the embodiment.

Next, a flow of the operation of the parking support apparatus 200 according to the embodiment will be explained with reference to FIG. 4. FIG. 4 is a flowchart illustrating the flow of the operation of the parking support apparatus according to the embodiment.

As illustrated in FIG. 4, in operation of the parking support apparatus 200 according to the embodiment, firstly, it is determined whether or not the user has got out of the vehicle 10 (step S101). The user's getting out of the vehicle may be set as a condition for determining whether or not the vehicle 10 is ready to start the parking control. Satisfaction of another condition, such as, for example, ignition off of the vehicle 10, may be determined as well. A method of determining the condition can adopt the existing techniques/technologies, as occasion demands, and a detailed explanation of the method will be thus omitted.

If it is determined that the user has not got out of the vehicle 10 (the step S101: NO), the subsequent process is omitted, and a series of the steps is ended. In this case, the parking support apparatus 200 may restart the process from the step S101 after a lapse of a predetermined period. On the other hand, if it is determined that the user has got out of the vehicle 10 (the step S101: YES), the parking control start determinator 240 confirms the reservation state of the parking control of the vehicle 10 (step S102). In other words, the parking control start determinator 240 confirms whether the reservation state of the parking control set by the vehicle control reservation unit 210 is on or off.

The parking control start determinator 240 then determines whether or not the confirmed reservation state of the parking control is on, i.e., whether or not the reservation of the parking control is accepted or received (step S103). If it is determined that the reservation state of the parking control is not on (in other words, the reservation state is off) (the step S103: NO), the subsequent process is omitted, and a series of the steps is ended. This is because it is not necessary to perform the parking control if the reservation of the parking control is not accepted or received. On the other hand, if it is determined that the reservation state of the parking control is on (the step S103: YES), monitoring the user by the vehicle external sensor 120 is started (step S104). In other words, the user's movement and voice/sound can be detected by the vehicle external sensor 120.

The parking control start determinator 240 then determines whether or not the parking instruction action by the user is detected, as a result of monitoring the user (step S105). Specifically, it is determined whether or not at least one of the user's movement and voice/sound that matches the parking instruction action is detected on the parking instruction action detector 220. If it is determined that the parking instruction action by the user is detected (the step S105: YES), the parking control start determinator 240 outputs an instruction for starting the parking control, to the parking control executor 250 (step S106). If the parking instruction control by the user is detected in the situation in which the reservation of the parking control is received, as described above, then, the parking control for automatically parking the vehicle 10 is started.

By the way, this is not illustrated in FIG. 4, but a control for appropriately performing the parking control may be performed between the detection of the parking instruction action and the actual start of the parking control. For example, the door lock is preferably on (i.e., a lock state) during the parking control, because the user is away for a while from the parked vehicle 10. Thus, if the parking instruction action is detected, a control for automatically turning on the door lock may be performed. In this case, the parking control may be started after the door lock is turned on, or a control for tuning on the door lock may be performed after the parking control is started (i.e. while the parking control is being performed, or after the parking control is completed). If the doorknob sensor 122 is provided as the vehicle external sensor 120, as already explained with reference to FIG. 3A, the operation associated with the door lock is set to be another operation that is different from the parking instruction action. In this case, even if the action for changing the on and off of the door lock is not detected, the control for tuning on the door lock may be performed at a time point at which the parking instruction action is detected. This makes is possible to avoid unnecessarily repeating the operation.

On the other hand, if it is determined that the parking instruction action by the user is not detected (the step S105: NO), the parking control start determinator 240 determines whether or not the parking instruction operation with the user terminal 50 is detected (step S107). If the parking instruction operation is detected (the step S107: YES), the parking control start determinator 240 outputs an instruction for starting the parking control, to the parking control executor 250 (the step S106). If the parking instruction operation with the user terminal 50 is detected even though the parking instruction action is not detected, then, the parking control is started. In other words, the user can select between performing the parking instruction action and performing the parking instruction operation with the user terminal 50, as a method for starting the parking control, as occasion demands.

If the parking instruction operation is not detected (the step S107: NO), it is determined whether or not a standby period until the start of the parking control is greater than or equal to a predetermined value (step S108). The standby period here may be counted, for example, from a time point at which it is determined that the user has got out of the vehicle, i.e., from a time point at which the step S101 is determined to be YES. Moreover, the predetermined value, which is a threshold value for a standby time, may be set as a time for determining that the parking control that is supposed to be performed remains not started, which is namely in an abnormal state in which neither the parking instruction action nor the parking instruction operation is detected.

If the standby period is not greater than or equal to the predetermined value (the step S108: NO), it is determined that the user likely performs the parking instruction action or the parking instruction operation from now, and the process after the step S104 is repeated. Thus, in this case, monitoring the user is continued. On the other hand, if the standby period is greater than or equal to the predetermined value (the step S108: YES), it is determined that the user extremely less likely performs the parking instruction action or the parking instruction operation from now, and the user terminal 50 is notified that the parking control is not started (step S109), and a series of the steps is ended. Thus, in this case, monitoring the user is stopped, and the parking control remains unexecuted.

As described above, if a series of the steps is ended in accordance with the standby time, it is possible to prevent that monitoring the user is continued even though the user does not intend to start the parking control. Moreover, notifying the user terminal 50 makes it possible to attract the user's attention. After it is determined that the standby time is greater than or equal to the predetermined value, the user may start the parking control by the parking instruction operation with the user terminal 50. Alternatively, monitoring the user (i.e., the operation of the vehicle external sensor 120), which is to detect the parking instruction action, may be restarted by a predetermined operation performed by the user.

Technical Effect

Next, a technical effect obtained by the parking support apparatus 200 according to the embodiment will be explained.

As explained by using FIG. 1 to FIG. 3B, according to the parking support apparatus 200 in the embodiment, the parking instruction action makes it possible to start the parking control of the vehicle 10 without operating the user terminal 50. Thus, the user who has got out of the vehicle 10 can start the parking control without any trouble, such as taking out the user terminal 50. Therefore, according to the parking support apparatus 200 in the embodiment, it is possible to start the parking control without causing the user to feel troublesome.

The method using the parking instruction action as described above has not only an effect of simplifying an instruction operation, but also an effect of starting the parking control even in a situation in which the user terminal 50 cannot be used. For example, if the user terminal 50 runs out of charge or is failed, or if the user uses the both hands and cannot operate the user terminal 50, or in similar cases, the parking instruction action makes it possible to certainly start the parking control.

Supplementary Notes

Various aspects of embodiments of the present disclosure derived from the embodiment explained above will be explained hereinafter.

Supplementary Note 1

A parking support apparatus described in Supplementary Note 1 is a parking support apparatus configured to perform a parking control for automatically parking a vehicle in a target parking position, the parking support control provided with: a detector configured to obtain a signal of a vehicle external sensor that can detect at least one of a movement and a voice/sound of a user who is outside the vehicle and to determine whether or not the at least one of the movement and the voice/sound of the user matches a parking instruction action set in advance, thereby detecting a particular parking instruction action of the user; and a starter configured to start the parking control if the parking instruction action is detected.

According to the parking support apparatus described in Supplementary Note 1, the parking control for automatically parking the vehicle is started on condition that at least one of the particular movement and the particular voice/sound of the user who is outside the vehicle is detected as the parking instruction action. This makes it possible to save a trouble, such as, for example, operating an exclusive terminal to start the parking control. It is thus possible to start the parking control.

Supplementary Note 2

In the parking support apparatus described in Supplementary Note 2, the vehicle includes an operator configured for the user to perform an operation of changing on and off of a door lock, and the detector is configured to detect an operation for the operator that is different from the operation of changing on and off of the door lock, as the parking instruction action.

According to the parking support apparatus described in Supplementary Note 2, the use of the operator, which is configured to perform the operation of changing on and off of the door lock (e.g., a doorknob), makes it possible to detect the parking instruction action. Since the parking instruction action is set as the operation that is different from the operation of changing on and off of the door lock, there is no risk of mixing up the operation of changing on and off of the door lock and an operation of starting the parking control. One operator allows the two operations, which are the operation of changing on and off of the door lock and the operation of starting the parking control.

Supplementary Note 3

In the parking support apparatus described in Supplementary Note 3, the starter is configured to turn on the door lock and to start the parking control if the operation for the operator that is different from the operation of changing on and off of the door lock is detected as the parking instruction action in a situation in which the door lock is off.

According to the parking support apparatus described in Supplementary Note 3, even if the door lock is off (i.e., it is not locked) at a time point at which the parking instruction action is detected, the parking control is started in the situation in which the door lock is on (i.e., it is locked). Alternatively, the door lock is turned on while the parking control is being performed or after the parking control is completed. It is thus possible to prevent the door lock from being forgotten, so that it is possible to improve the security of the vehicle. It is also possible to avoid unnecessarily repeating the operation, because the operation of changing the door lock to be on and the operation of starting the parking control can be performed at the same time.

Supplementary Note 4

In the parking support apparatus described in Supplementary Note 4, the parking support apparatus further comprises a reservation device configured to accept a reservation of the parking control, and the detector is configured to detect the parking instruction action if the reservation is accepted, and is configured not to detect the parking instruction action if the reservation is not accepted.

According to the parking support apparatus described in Supplementary Note 4, the parking instruction action is not detected unless the reservation of the parking control is reserved. This makes it possible to prevent the parking control from being unintentionally started. It is only necessary to detect the parking instruction action in a situation in which the reservation is accepted or received. It is thus possible to suppress or reduce electric power consumption, for example, on a sensor for detecting the parking instruction action.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A parking support apparatus configured to perform a parking control for automatically parking a vehicle in a target parking position, said parking support apparatus comprising:
a controller comprising at least one circuit or at least one processor, the controller configured to:
obtain a signal of a vehicle external sensor, that can detect at least one from among a movement and a voice/sound of a user who is outside the vehicle, and to determine whether or not the at least one from among the movement and the voice/sound of the user matches a parking instruction action set in advance, thereby detecting a particular parking instruction action of the user;
accept a reservation of the parking control by turning on a reservation state for detecting the parking instruction action; and
start the parking control based on the parking instruction action being detected,
wherein the vehicle external sensor is configured to detect a first operation by the user on an exterior of the vehicle for the vehicle to perform an action when the reservation state is off, other than the parking control, and a second operation by the user on the exterior of the vehicle for the parking control, the second operation being different from the first operation,
wherein the controller is further configured to, based on an output of the vehicle external sensor, detect the first operation as the parking instruction action based on the reservation state being on, and as the action other than the parking control based on the reservation state being off, and
the controller is further configured to, based on the output of the vehicle external sensor, detect the second operation by the user as the parking instruction action in a case when the reservation state is on and in a case when the reservation state is off.

2. The parking support apparatus according to claim 1, wherein the first operation, that the vehicle external sensor is configured to detect, is for changing on and off a door lock when the reservation state is off.

3. The parking support apparatus according to claim 2, wherein the controller is configured to turn on the door lock and to start the parking control based on the second operation by the user being detected by the controller as the parking instruction action in a situation in which the door lock is off.

4. A parking support apparatus configured to perform a parking control for automatically parking a vehicle in a target parking position, said parking support apparatus comprising:
a controller comprising at least one circuit or at least one processor, the controller configured to:
obtain a signal of a vehicle external sensor, that can detect at least one from among a movement and a voice/sound of a user who is outside the vehicle, and to determine whether or not the at least one from among the movement and the voice/sound of the user matches a parking instruction action set in advance, thereby detecting a particular parking instruction action of the user;
accept a reservation of the parking control by turning on a reservation state for detecting the parking instruction action; and
start the parking control based on the parking instruction action being detected, wherein the controller is configured to determine that a first movement or voice/sound matches the parking instruction action based on the reservation state being on, and determine that a second movement or voice/sound matches the parking instruction action based on the reservation state being off, the first movement or voice/sound being different from the second movement or voice/sound.

5. The parking support apparatus according to claim 2, wherein the vehicle external sensor is a door handle sensor.

* * * * *